Oct. 29, 1963          R. A. LESTER                3,109,112
                  DOUBLE FREQUENCY TRANSDUCER
                    Filed March 13, 1962

3,109,112
DOUBLE FREQUENCY TRANSDUCER

Robert A. Lester, Pitcairn, Pa., assignor, by mesne assignments, to the United States of America as represented by the Secretary of the Navy
Filed Mar. 13, 1962, Ser. No. 179,497
5 Claims. (Cl. 310—8.7)

The present invention relates to translating devices for converting compressional wave energy to electrical energy and vica versa. More particularly, the invention relates to novel and improved transducer devices having identical acoustical centers and beam patterns.

Apparatus utilizing a pair of oppositely directed beams are often used with particular success in the art of the measurement of the flow of fluids. More specifically, when such apparatus is used, the effect of local eddy currents cancel out, the possibility of partial or total obstruction of small orifices are eliminated, and the use of vanes and other moving parts is avoided. Where, however, substantial temperature gradients exist in the fluid to be measured, the acoustic beams have in the past been diffracted differently in patches of warmer or colder fluid and substantial inaccuracies in the flow measurement readings have resulted.

It is therefore a principal object of the present invention to provide a novel and improved transducer device for use in the ultrasonic measurement of the flow of fluids.

It is a further object of the present invention to provide a novel and improved multi-beam transducer device which provides a common beam center and pattern.

Other objects and many of the attendant advantages of this invention will be readily appreciated as the same becomes better understood by reference to the following detailed description when considered in connection with the accompanying drawings wherein.

Figure 1:
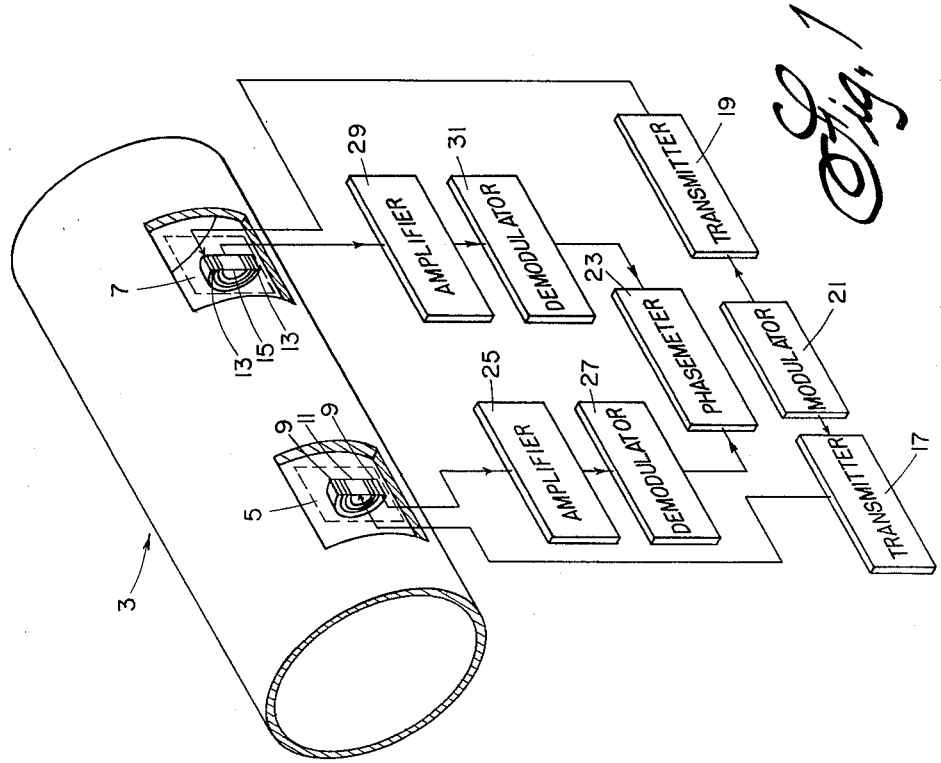
FIGURE 1 is a diagrammatic view of an improved transducer device of the present invention as it is used in a conventional multi-beam ultarsonic flowmeter.

A preferred embodiment of the present invention as it might be used in an ultrasonic flow measuring device is illustrated in FIGURE 1 of the drawing. As shown therein, the water or other fluid, the flow of which is to be measured, is conducted through the tube or conduit 3 from left to right. The conventional probe-like structures 5 and 7, which are spaced one from the other within the conduit, provide physical supports and sealed housings for the four annular transducer elements 9, 11, 13 and 15. As will be more apparent hereinafter, transducers 11 and 15 provide a first acoustic path from left to right through the fluid in the conduit and transducers 13 and 9 which are respectively concentric with transducers 15 and 11 provide a second acoustic path from right to left through the fluid in the conduit. Transducers 11 and 13 are respectively energized by transmitters 17 and 19 which develop carrier signals that are modulated by modulator 21. The carrier frequencies of transmitters 17 and 19 are widely separated in order to avoid cross talk between the two acoustic paths. Transducer 15 which receives acoustic energy from transducer 11 is electrically coupled to the phasemeter 23 through a circuit that includes the series connected to amplifier 25 and demodulator 27. Transducer 9 which receives acoustic energy from transducer 13 is electrically coupled to the phasemeter 23 through a circuit that includes the series connected amplifier 29 and demodulator 31. Thus, it is seen that a pair of electro-acoustic paths operating on unique carrier frequencies extend in opposite directions through the fluid in the conduit. Since sound in a moving fluid propagates at a velocity equal to the velocity of sound in the fluid when the fluid is at rest plus the velocity of the fluid, the phase shifts of the two receiver signals are dependent on the motion of the fluid. Thus, when there is no movement of the fluid, the phase of the two signals remains the same. When, however, there is fluid movement, a phase lead is produced at one receiver and a phase log is produced at the other receiver. Comparison of the phases of the two signals in the phasemeter 23 therefore provides an output voltage reading which is proportional to the flow of the fluid through the conduit.

In measuring the flow of water or fluid in which there are large temperature gradients across the cross-section of flow, the concentric acoustic beams are often diffracted differently by patches of warm or cold fluid. As indicated hereinabove, it is the specific purpose of the present invention to avoid this difficulty and still provide identical radiation patterns for the two acoustic beams. This is accomplished by providing the two beams with identical acoustical centers.

The beam pattern of a ring or annular radiator is given by the equation $$\frac{P_\phi}{P_0} = J_0\left(\frac{2\pi a}{\lambda} \sin \phi\right) \tag{1}$$

where $P_\phi$ = pressure at the angle $\phi$ to the transducer
$P_0$ = maximum pressure
$a$ = average radius of ring or annulus
$\lambda$ = wavelength
$J_0$ = the zero order Bessel function It is seen from Equation 1 that two rings operating at different frequencies will have the same beam pattern if their radius-wavelength ratio $(a/\lambda)$ is the same.

Figure 2:
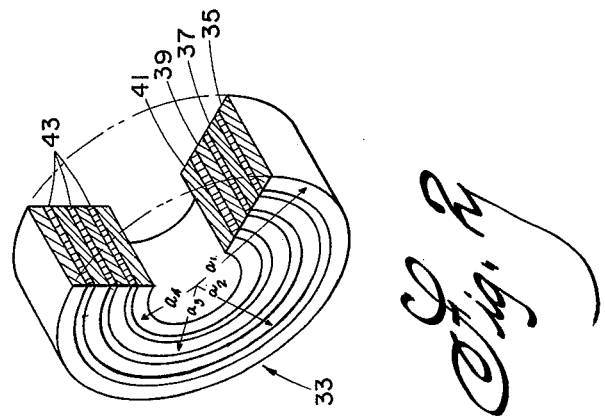
FIGURE 2 is a perspective detailed view of the improved transducer device shown in FIGURE 1.

A preferred embodiment of the improved double frequency transducer of the present invention constructed in accordance with this principle is illustrated in FIGURE 2 of the drawing. As shown therein, the vibrating surface of the transducer 33 preferably has a plurality of concentric piezoelectric rings 35, 37, 39 and 41 separated or insulated one from another by any suitable vibratory absortion material 43. When used as a double frequency transducer as in the above described flowmeter, alternate conductive rings 35 and 39 of the transducer are energized and vibrated at a first carrier frequency $f_1$ while the other rings 37 and 41 of the transducer are energized and vibrated at a second carrier frequency $f_2$. The respective radii $a_1$, $a_2$, $a_3$ and $a_4$ of rings 35, 37, 39 and 41 of transducer 33 are dimensioned so as to satisfy the equations:

$$a_1 f_1 = a_2 f_2 \tag{2}$$

and $$a_3 f_1 = a_4 f_2 \tag{3}$$

It will be noted, therefore, that the dual frequency transducer 33 satisfies the requirements of Equation 1 and provides beams having identical beam patterns and acoustical centers that are not effected by temperature gradients in the water.

The plurality of rings for each carrier signal provides conventional shading and therefore improved directivity of the beams through the fluid. Although two rings are provided herein for each carrier signal, it is to be understood that any greater or fewer number of rings could be provided to vary the beam pattern without departing from the spirit or scope of the present invention.

It is also to be understood that although the vibrating elements of the transducer are described herein as being annular, any other suitable concentric geometric form could be used without departing from the spirit or scope of the present invention.

Obviously many modifications and variations of the present invention are possible in the light of the above teachings. It is therefore to be understood that within the scope of the appended claims the invention may be practiced otherwise than as specifically described.

What is claimed is:

1. A device for producing and receiving a plurality of compressional waves said device comprising a first transducer which is adapted to transmit energy at a first unique frequency; and a second transducer concentric to the first transducer said second transducer being adapted to receive energy at a second unique frequency, the dimensions of said transducers being such that their acoustic centers and beam patterns coincide.

2. A device for producing and receiving a plurality of compressional waves said device comprising a first annular piezoelectric element which is adapted to transmit energy at a first unique frequency; and a second annular piezoelectric element concentric to the first piezoelectric element said second piezoelectric element being adapted to receive energy at a second unique frequency, the radii of said piezoelectric elements being such that their acoustic centers and beam patterns coincide.

3. A device for producing and receiving a plurality of compressional waves said device comprising a first annular piezoelectric element which is adapted to transmit energy at a first unique frequency; and a second annular piezoelectric element concentric to the first piezoelectric element said second piezoelectric element being adapted to receive energy at a second unique frequency, the radii of said piezoelectric elements being inversely proportional to the frequencies at which the elements are to be energized and vibrated.

4. A device for producing and receiving compressional waves said device comprising a plurality of insulated concentric piezoelectric elements; means for connecting alternate concentric elements in parallel and for transmitting energy therefrom at a first unique frequency; means for connecting the remaining concentric elements in parallel and for receiving energy thereon at a second unique frequency, the radii of each of said piezoelectric elements being such that their acoustic centers and beam patterns coincide.

5. A device for producing and receiving compressional waves said device comprising a plurality of insulated concentric piezoelectric elements; means for connecting alternate concentric elements in parallel and for transmitting energy therefrom at a first unique frequency; means for connecting the remaining concentric elements in parallel and for receiving energy thereon at a second unique frequency, the radius of each of the said piezoelectric elements be in inversely proportional to the frequency at which it is energized and vibrated.

References Cited in the file of this patent

UNITED STATES PATENTS

| | | |
|---|---|---|
| 2,458,288 | Moriarty | Jan. 4, 1949 |
| 2,748,369 | Smyth | May 29, 1956 |
| 2,993,373 | Kritz | July 25, 1961 |